United States Patent
Kim et al.

(10) Patent No.: US 10,732,431 B2
(45) Date of Patent: Aug. 4, 2020

(54) DISPLAY DEVICE, DISPLAY SYSTEM, AND CONTROL METHOD THEREOF

(71) Applicant: SAMSUNG DISPLAY CO., LTD., Yongin, Gyeonggi-Do (KR)

(72) Inventors: Beom Shik Kim, Yongin-si (KR); Tae Hyeog Jung, Hwaseong-si (KR); Hui Nam, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 1596 days.

(21) Appl. No.: 14/297,508

(22) Filed: Jun. 5, 2014

(65) Prior Publication Data

US 2015/0070475 A1  Mar. 12, 2015

(30) Foreign Application Priority Data

Sep. 10, 2013 (KR) .................. 10-2013-0108589

(51) Int. Cl.
| | | |
|---|---|---|
| H04N 13/00 | (2018.01) | |
| G02B 30/52 | (2020.01) | |
| H04N 13/395 | (2018.01) | |
| H04N 13/376 | (2018.01) | |

(52) U.S. Cl.
CPC .......... *G02B 30/52* (2020.01); *H04N 13/376* (2018.05); *H04N 13/395* (2018.05); *H04N 2213/001* (2013.01); *H04N 2213/006* (2013.01)

(58) Field of Classification Search
CPC ............................ H04N 13/0468; H04N 13/04
USPC .......................................................... 348/51
See application file for complete search history.

(56) References Cited

U.S. PATENT DOCUMENTS

| | | | | |
|---|---|---|---|---|
| 5,532,736 A * | 7/1996 | Kuriki | ..................... | H04N 7/144 348/14.16 |
| 5,589,957 A * | 12/1996 | Aritake | .................. | G02B 27/22 359/22 |
| 5,742,331 A * | 4/1998 | Uomori | ................ | H04N 13/302 348/51 |
| 5,745,197 A * | 4/1998 | Leung | ................ | G02B 27/2278 348/E13.02 |
| 6,274,978 B1 * | 8/2001 | Roach | ..................... | G09F 9/305 313/483 |
| 6,697,034 B2 * | 2/2004 | Tashman | ............ | G02B 27/2271 345/31 |
| 7,259,505 B2 * | 8/2007 | Cok | ..................... | H01L 51/5259 313/112 |

(Continued)

FOREIGN PATENT DOCUMENTS

| | | |
|---|---|---|
| CN | 100533228 C | 8/2009 |
| CN | 102096197 A | 6/2011 |

(Continued)

OTHER PUBLICATIONS

S. Park et al., Investigation on optical performance of transparent displays, 2014.*

(Continued)

*Primary Examiner* — Luis Perez-Fuentes
(74) *Attorney, Agent, or Firm* — Lewis Roca Rothgerber Christie LLP

(57) ABSTRACT

A display device includes a frame; and a transparent display module in the frame, the transparent display module including a horizontal cross-section including a closed curve and configured to emit light from opposite surfaces thereof.

17 Claims, 11 Drawing Sheets

(56) References Cited

U.S. PATENT DOCUMENTS

| | | | | |
|---|---|---|---|---|
| 7,493,153 | B2* | 2/2009 | Ahmed | G02B 27/017 345/7 |
| 7,518,593 | B2* | 4/2009 | Daiku | G02B 6/0058 345/102 |
| 7,583,252 | B2* | 9/2009 | Kurtenbach | G02B 27/2271 345/156 |
| 7,587,120 | B2* | 9/2009 | Koo | H04N 13/0495 385/146 |
| 7,847,756 | B2* | 12/2010 | Ishibashi | G09G 3/003 345/31 |
| 8,142,283 | B2* | 3/2012 | Lutnick | G07F 17/32 463/29 |
| 8,717,360 | B2* | 5/2014 | Vesely | G06T 15/00 345/419 |
| 8,854,439 | B2* | 10/2014 | Ito | G02B 27/2264 348/54 |
| 8,933,998 | B2* | 1/2015 | Ito | H04N 13/302 348/51 |
| 8,937,592 | B2* | 1/2015 | Marti | G06T 15/20 345/158 |
| 9,046,758 | B2* | 6/2015 | Liu | G02B 5/0252 |
| 9,093,658 | B2* | 7/2015 | Krall | H01L 51/52 |
| 9,158,189 | B2* | 10/2015 | Joseph | G03B 21/604 |
| 9,230,500 | B2* | 1/2016 | Yang | G09G 5/00 |
| 9,282,614 | B2* | 3/2016 | Yang | H05B 33/10 |
| 9,384,594 | B2* | 7/2016 | Maciocci | G06F 3/011 |
| 2004/0192430 | A1* | 9/2004 | Burak | G02B 27/2214 463/20 |
| 2007/0009222 | A1* | 1/2007 | Koo | G02B 30/52 385/147 |
| 2010/0238366 | A1 | 9/2010 | Chang et al. | |
| 2011/0304614 | A1* | 12/2011 | Yasunaga | H04N 13/376 345/419 |
| 2014/0355249 | A1* | 12/2014 | Yu | G09F 13/06 362/97.1 |
| 2015/0070475 | A1* | 3/2015 | Kim | G02B 27/2278 348/51 |

FOREIGN PATENT DOCUMENTS

| | | |
|---|---|---|
| CN | 202512300 U | 10/2012 |
| JP | 2005-208130 A | 8/2005 |
| JP | 2010-217589 A | 9/2010 |
| JP | 2011-259373 A | 12/2011 |
| JP | 2012-155082 A | 8/2012 |
| KR | 10-2007-0006119 A | 1/2007 |
| KR | 10-2010-0009739 A | 1/2010 |
| TW | 201035966 A1 | 10/2010 |

OTHER PUBLICATIONS

See-Through Image Blurring of Transparent OLED display; Calculation Method Based on Diffraction and Analysis of Pixel Structures; Zong; Nov. 2016.*
The Process and Reliability Tests of Glass-to-glass Laser Bonding for Top-emission OLED Device; Y. Lai; 2012.*
Transparent Electronics for See-Through OLED displays; Riedl T; 2009.*
14297508-Fast-Focus EIC search.*
Volumetric three-dimensional display using transparent rotating Lanthanide complexes sheet; Shintaro; 2007.*
14297508-Fast-Focus EIC-USPTO search; 2019. (Year: 2019).*
Volumetric three-dimensional display using transparent rotating sheet; Shintaro; 2007. (Year: 2007).*
EPO Search Report dated Feb. 10, 2015, corresponding to European Patent application 14178393.6, (6 pages).

* cited by examiner

DISPLAY DEVICE, DISPLAY SYSTEM, AND CONTROL METHOD THEREOF

CROSS-REFERENCE TO RELATED APPLICATION

This application claims priority to and the benefit of Korean Patent Application No. 10-2013-0108589 filed in the Korean Intellectual Property Office on Sep. 10, 2013, the entire contents of which are incorporated herein by reference.

BACKGROUND

1. Field

Embodiments of the present invention relate to a display device, a display system, and a control method thereof.

2. Description of the Related Art

A display device may be capable of displaying a stereoscopic image regardless of a position of a viewer by tracking the position of the viewer and moving an electric field-driven liquid crystal lens according to the position of the viewer.

Such a stereoscopic image display device serving as a glassless type of display device can widen a stereoscopic image-visible area by using a position tracking function to track the relative position of a viewer to deal with a problem of a narrow viewing area. However, the expanded range is restrictive depending on the size of a display.

The above information disclosed in this Background section is only for enhancement of understanding of the background of the invention and therefore it may contain information that does not form the prior art that is already known in this country to a person of ordinary skill in the art.

SUMMARY

Embodiments of the present invention include a display device having aspects of being capable of displaying a stereoscopic image to a viewer.

Aspects of an example embodiment include a display device including a frame; and a transparent display module in the frame, the transparent display module having a horizontal cross-section including a closed curve and configured to emit light from opposite surfaces thereof.

The horizontal cross-section of the display module may have a circularly or ellipsoidally tubular shape.

The opposite surfaces of the display module may include a first light emitting surface configured to display a first image, and a second light emitting surface opposite to the first light emitting surface and configured to display a second image, and the first light emitting surface may face outside in a radial direction of the display module, and the second light emitting surface may face inside in the radial direction of the display module.

The first light emitting surface and the second light emitting surface may be configured to display images in 360 degrees with respect to a longitudinal central axis of the display module.

Aspects of an example embodiment include a display device including a transparent display module having a horizontal cross-section including a closed curve and configured to emit light from opposite surfaces thereof; and a display region controller configured to control a position of a display region for displaying an image by the display module.

The horizontal cross-section of the display module may have a circularly or ellipsoidally tubular shape, and the display module may include a first light emitting surface facing outside in a radial direction of the display module, and a second light emitting surface facing inside in the radial direction.

The display region controller may be configured to control the display region of the display module, and the display region may include a first display region and a second display region, and the first display region may be a portion of the first light emitting surface and may be configured to display a first image, and the second display region may be a portion of the second light emitting surface opposite to the first display region with respect to a longitudinal central axis of the display module, and the second display region may be configured to display a second image.

The display system may further include an image storage configured to store the first image and the second image.

The display system may further include an image input section configured to input the first image and the second image.

The second image may be displayed in a same direction as the first image.

Each of the first display region and the second display region has a circular arc or curve shaped cross-section with an angle of 180 degrees or smaller with respect to the longitudinal central axis.

The display system may further include a camera configured to photograph a position of a viewer who views the transparent display module, and the display region controller may include: a camera controller configured to control the camera according to the position of the viewer; and a position determiner configured to determine the position of the viewer photographed by the camera, and the display region controller may be configured to control positions of the first display region and the second display region according to the position of the viewer determined by the position determiner.

The display region controller may be configured to control the first display region and the second display region such that the first image and the second image are displayed in a direction in which the viewer is located.

The first image may be a foreground image, and the second image may be a background image.

Aspects of an example embodiment include a display control method of a transparent display module, the transparent display module including: a horizontal cross-section including a closed curve, a first light emitting surface facing externally in a radial direction of the display module, and a second light emitting surface facing internally in the radial direction, wherein the transparent display module is configured to emit light from the first and second light emitting surfaces, the display control method including: determining a position of a viewer who views the transparent display module; and respectively providing a first display region on which a first image is displayed and a second display region on which a second image is displayed onto the first light emitting surface and the second light emitting surface in a direction in which the viewer is located.

The determining of the position of the viewer who views the transparent display module may include: tracking a position of a face or an eye of the viewer, and obtaining coordinates of the position of the face or eye of the viewer.

The display control method may further include comparing position coordinates of the face or eye with reference position coordinates; determining a movement amount of the face or eye; and moving positions of the first display region and the second display region according to the movement amount of the face or eye after determining the position of the viewer who views the transparent display module.

In accordance with the example embodiment, it is possible to provide a display device capable of providing a stereoscopic image to a viewer.

DETAILED DESCRIPTION

Figure 1:
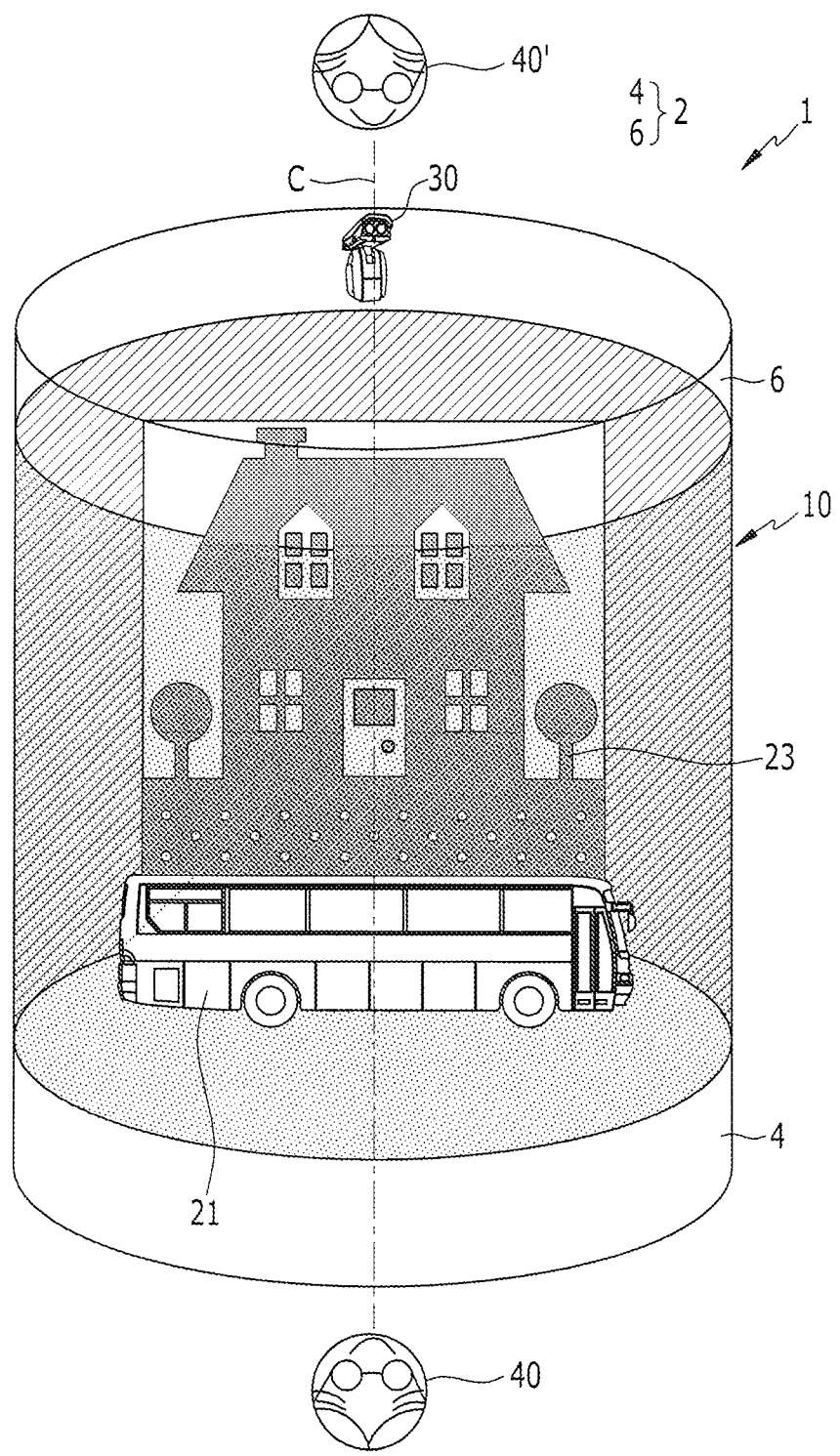
FIG. 1 is a perspective view showing a display device in accordance with an example embodiment.

Hereinafter, example embodiments will be described in some detail with reference to the attached drawings such that the present invention can be easily put into practice by those skilled in the art. As those skilled in the art would realize, the described embodiments may be modified in various different ways, all without departing from the spirit or scope. The drawings and description are to be regarded as illustrative in nature and not restrictive. Like reference numerals designate like elements throughout the specification.

Figure 2:
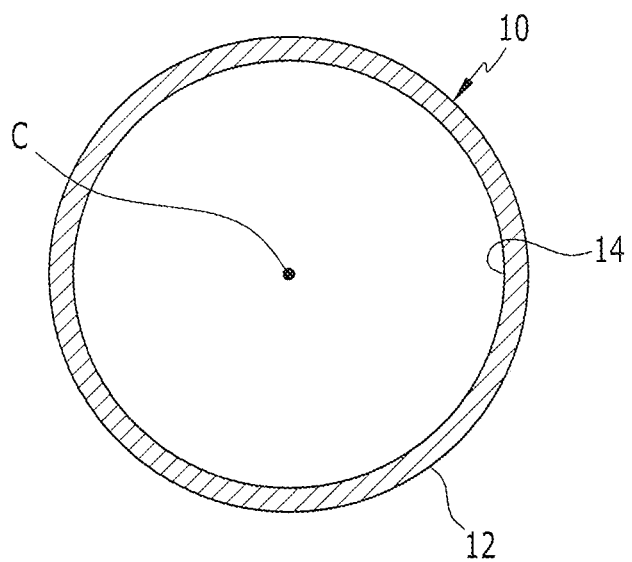
FIG. 2 is a horizontal cross-sectional view showing the display device in accordance with the present example embodiment.
Figure 3:
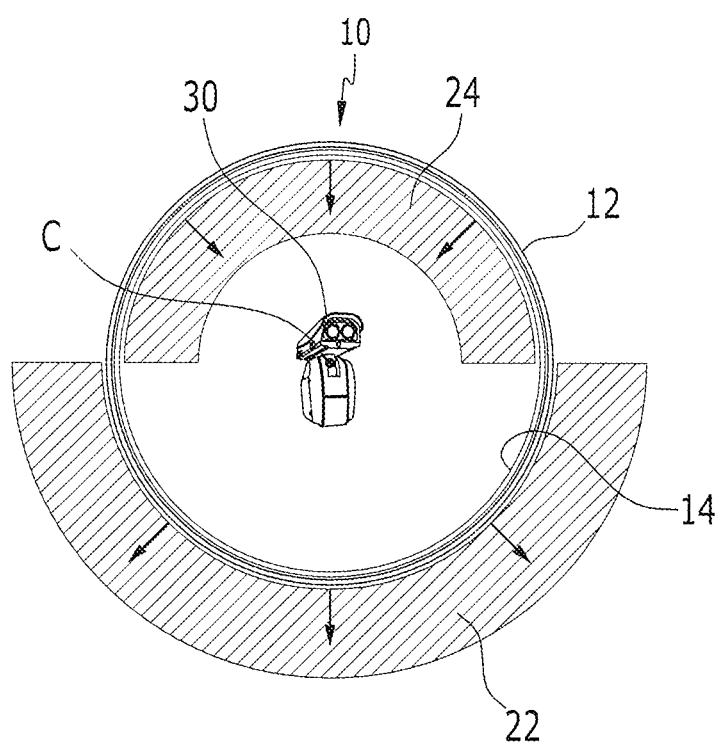
FIG. 3 shows a display region formed on a light emitting surface of the display device in accordance with the present example embodiment.
Figure 4:
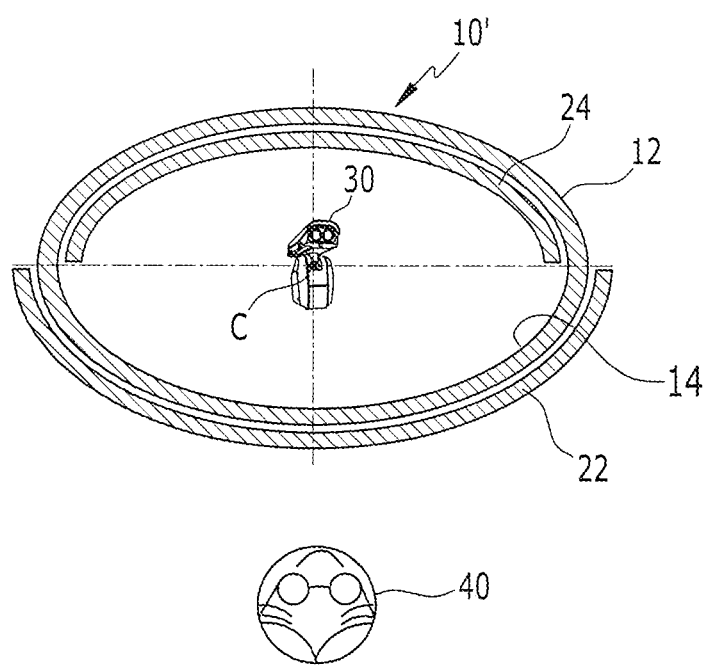
FIG. 4 is a horizontal cross-sectional view showing a display device in accordance with a modification of the present example embodiment.
Figure 5:
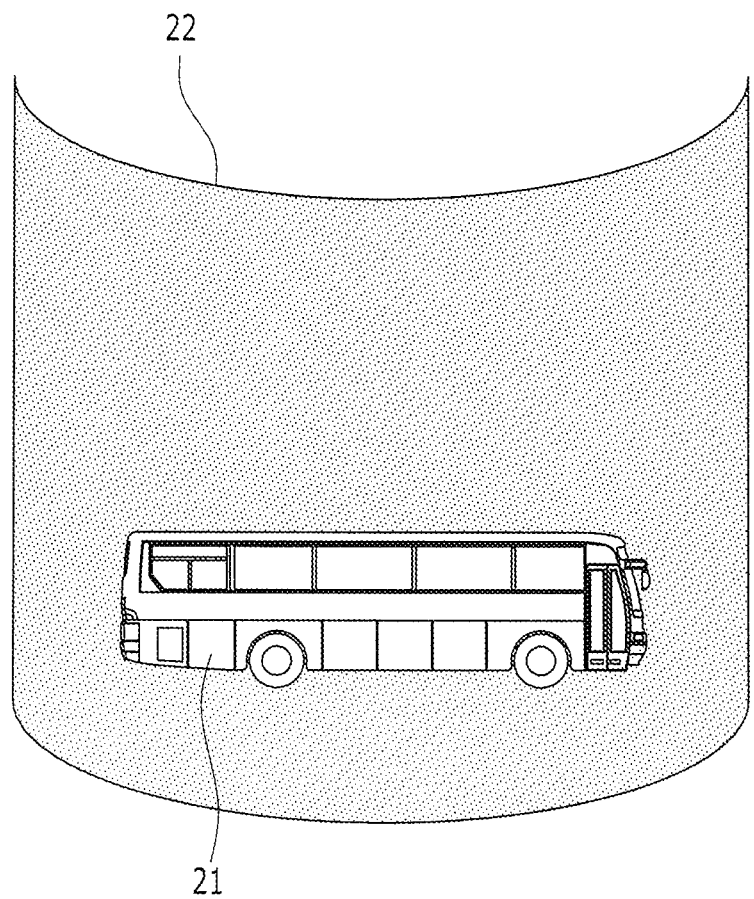
FIG. 5 shows how a first image is displayed on a first display region of the display device in accordance with the present example embodiment.
Figure 6:
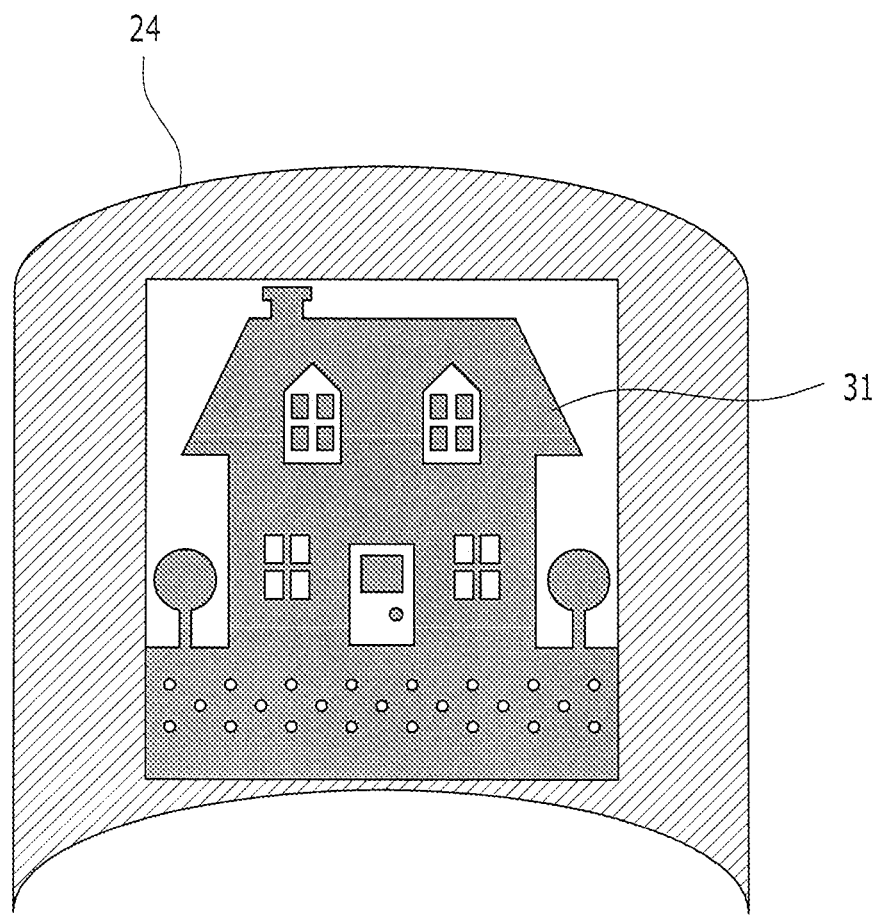
FIG. 6 shows how a second image is displayed on a second display region of the display device in accordance with the present example embodiment.

FIG. 1 is a perspective view showing a display device in accordance with an example embodiment. FIG. 2 is a horizontal cross-sectional view showing the display device in accordance with the present example embodiment. FIG. 3 shows a display region formed on a light emitting surface of the display device in accordance with the present example embodiment. FIG. 4 is a horizontal cross-sectional view showing a display device in accordance with a modification of the present example embodiment. FIG. 5 shows how a first image is displayed on a first display region of the display device in accordance with the present example embodiment. FIG. 6 shows how a second image is displayed on a second display region of the display device in accordance with the present example embodiment.

In FIG. 1, a first viewer 40 located at a lower side of FIG. 1 indicates a viewer or user who is located in front of a first display region of the display device 1, i.e., outside the display device, and views the display device 1 which is in a state that a first image 21 is located ahead or in front of a second image 23, and a second viewer 40' located at an upper side of FIG. 1 indicates a viewer who is located at an opposite side to the first viewer 40 with respect to a vertical central axis C of the display device 1 and views the display device 1.

Referring to FIG. 1 to FIG. 6, the display device 1 in accordance with the present example embodiment may include a frame 2 and a display module 10.

The display module 10 may be formed of a flexible material, and may have a tubular or cylindrical shape and a horizontal cross-section formed of a closed curved line (e.g., a circle or oval). Further, the display module 10 may be transparent and be capable of emitting light from opposite surfaces thereof.

As shown in FIG. 3, the display module 10 of the present example embodiment is formed to have a circular cross-section, but the cross-section of the display module is not limited thereto. Alternatively, as shown in FIG. 4, the display module 10' may be formed to have an ellipsoidal shape.

The display module 10 in accordance with the example embodiment may include a well-known display panel having an OLED or LCD, but the display panel for the display device 1 in accordance with the present example embodiment is not limited thereto.

In accordance with the present example embodiment, the circularly or ellipsoidally tubular display module 10 may have an active area thereof arranged in a circular or ellipsoidal shape with a rotation axis thereof, and a terminal portion of the display panel in which a flexible printed circuit board (FCB) is mounted may be formed to have a curved shape.

Although not shown, a terminal portion of the display panel to which the FPCB is closely brought into contact with may be a non-active area, and the remaining area in which no FPCB is installed may be an active display area.

In the display active area, unit cells of the display panel may be formed to be displayed by crossing a data signal and a scan signal.

In accordance with the present example embodiment, the frame 2 may be coupled to the display module 10 to support the display module 10.

The frame 2 may include a lower frame 4 located below the display module and an upper frame 6 located above the display module.

Each of the lower frame 4 and the upper frame 6 may be formed to have a tubular shape with such a horizontal cross-section so as to allow an external side surface thereof to correspond to the horizontal cross-section of the display module 10.

Each of the lower frame 4 and the upper frame 6 may support the display module 10, and include electron components and circuits for operating the display module 10 therein.

In accordance with the example embodiment, the display module 10 can display an image in 360 degrees with respect to the display device 1 through the display module 10 such that a viewer 40 who watches the display device 1 at the outside of the display device 1 can view the display device 1 in 360 degrees.

In this case, the image which is displayed through the display module 10 may include moving images as well as static images.

The display device 1 of the present example embodiment enables the viewer 40 who watches the display device 1 to view stereoscopic images.

To that end, the display device 1 in accordance with the example embodiment includes a first light emitting surface 12 and a second light emitting surface 14 as shown in FIG. 2.

The first light emitting surface 12 is a surface which emits light toward the outside when viewed in a radial direction of the display module 10, and the second light emitting surface 14 is a surface which emits light toward the inside when viewed in the radial direction of the display module 10.

The first light emitting surface 12 and the second light emitting surface 14 can display images in 360 degrees with respect to a longitudinal central axis of the display module 10.

In accordance with the example embodiment, a first display region 22 and a second display region 24 are respectively formed in the first light emitting surface 12 and the second light emitting surface 14.

Referring to FIG. 3 and FIG. 5, the first display region 22 may be defined as a portion of the first light emitting surface 12 to display an image thereon as a region on the first light emitting surface 12 to display the first image 21, e.g., a foreground toward the outside in the radial direction.

Referring to FIG. 3 and FIG. 6, the second display region 24 may be defined as a portion of the second light emitting surface 14 to display an image thereon as a region on the second light emitting surface 14 to display the second image 23 (e.g., a background toward the inside in the radial direction).

In this case, each of the first display region 22 and the second display region 24 may be formed in such a range so as to have a circular arc or curved line shaped cross-section with an angle of 180 degree or smaller with respect to a longitudinal central axis of the display module 10.

In the figures of this specification, the first display region 22 or the second display region 24 is shown as a shaded area located outside the first light emitting surface 12 or inside the second light emitting surface 14 in order to distinguish the first display region 22 or the second display region 24 from the first light emitting surface 12 or the second light emitting surface 14. However, it will be understood by any person of ordinary skill in the art that the first display region 22 or the second display region 24 actually indicates a portion of the first light emitting surface 12 or the second light emitting surface 14 to display an image thereon.

In the meantime, the display device 1 in accordance with the example embodiment may include a constituent element of a display system for determining a position of a viewer who watches the display device 1 and controlling a display region which is displayed on a display module of the display device 1.

Figure 7:
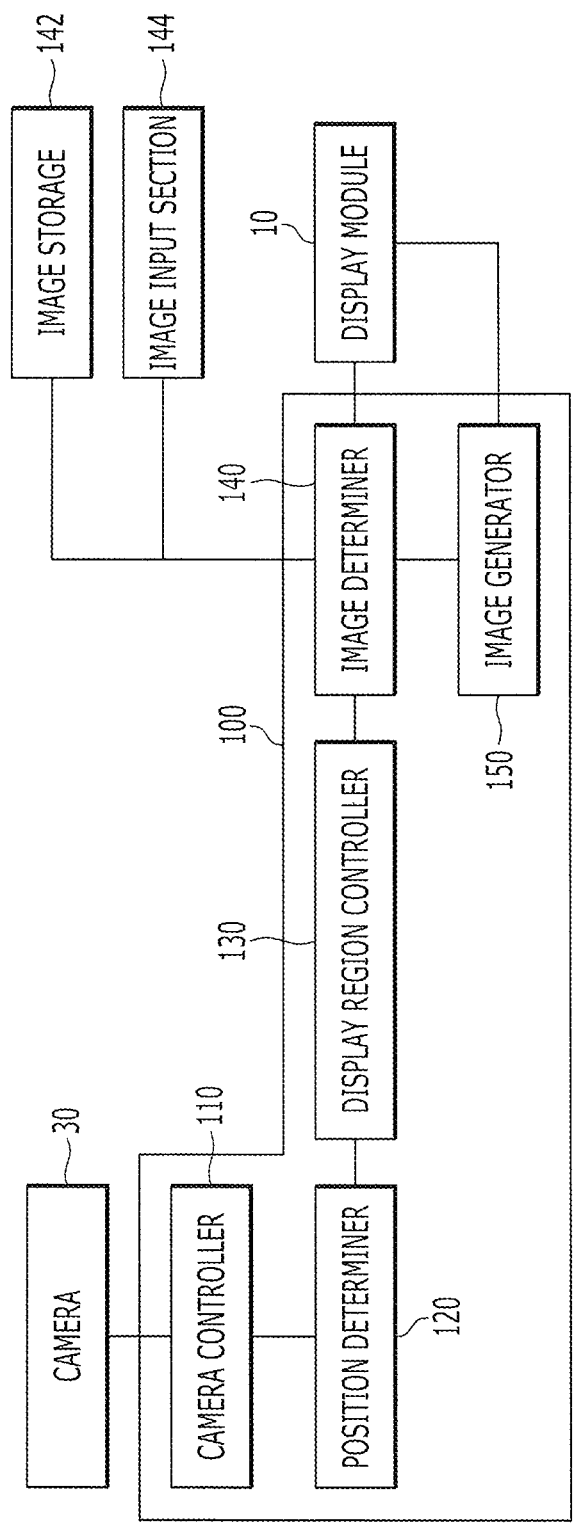
FIG. 7 is a schematic diagram of a display system in accordance with another example embodiment.
Figure 8:
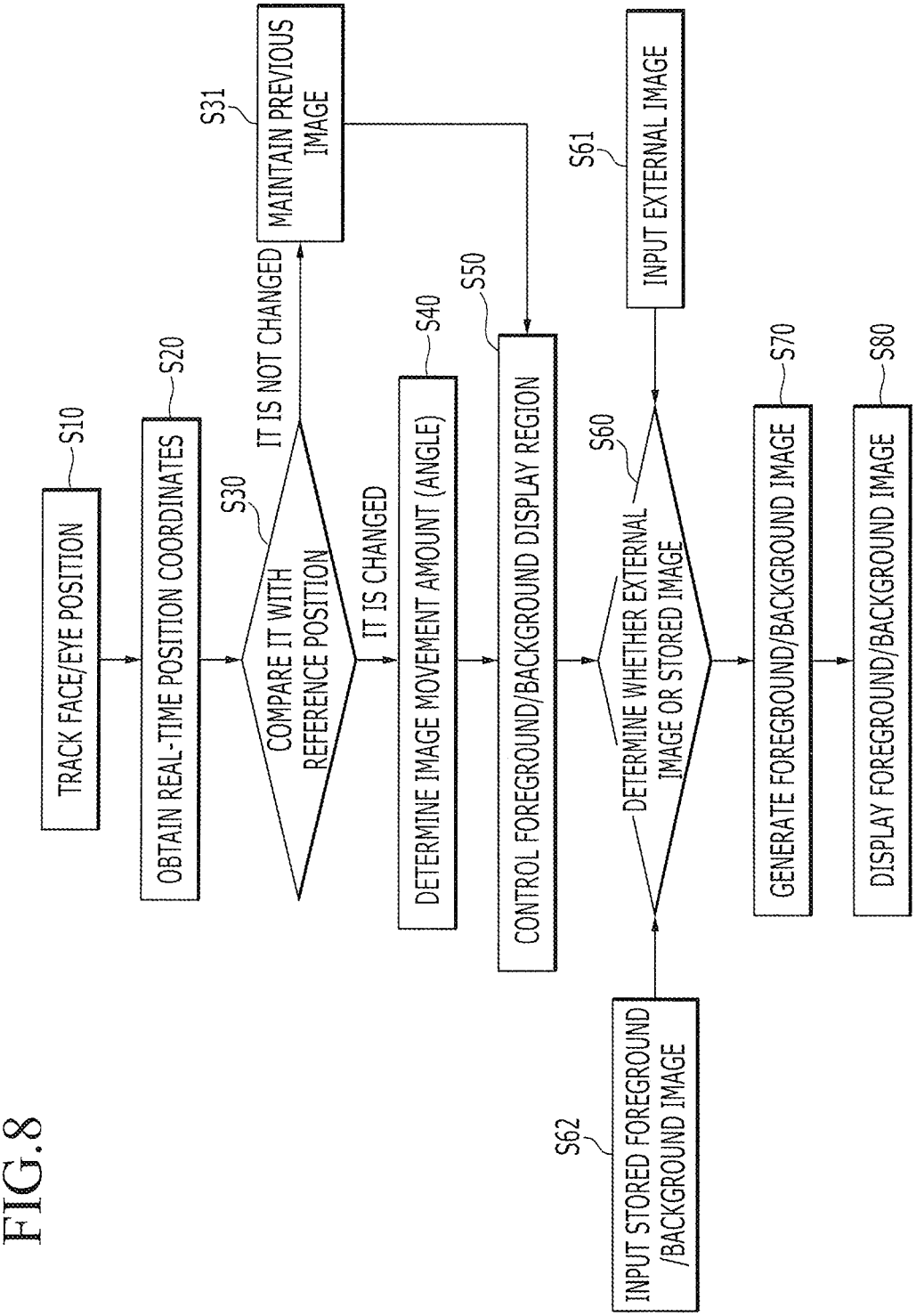
FIG. 8 is a flowchart showing how the display system is operated in accordance with the present example embodiment.
Figure 9:
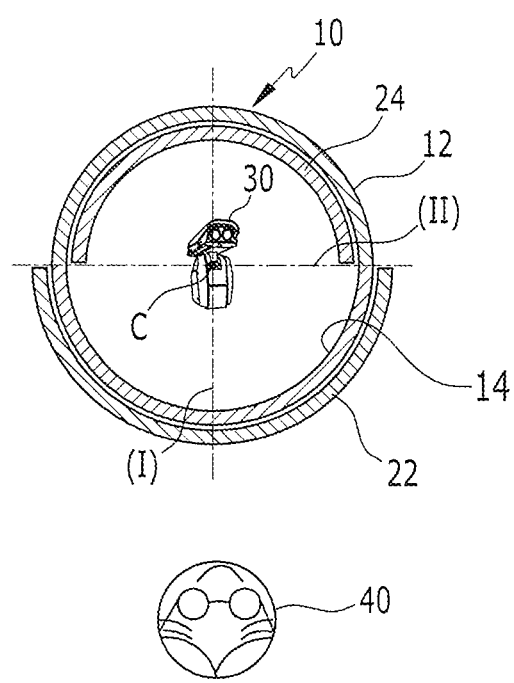
FIG. 9 shows positions of a camera and a viewer who views the display device in accordance with the present example embodiment.
Figure 10:
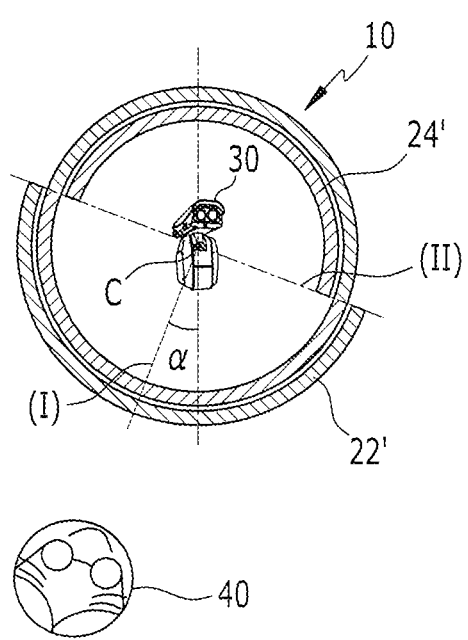
FIG. 10 and FIG. 11 show how the first display region and the second display region of the display device are changed according to a position of the viewer in accordance with the present example embodiment.
Figure 11:
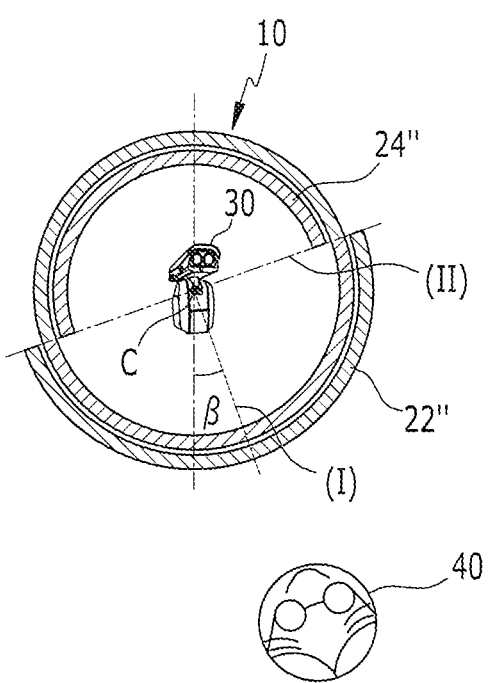

FIG. 7 is a schematic diagram of a display system in accordance with another example embodiment. FIG. 8 is a flowchart showing how the display system is operated in accordance with the present example embodiment. FIG. 9 shows positions of a camera and a viewer who views the display device in accordance with the present example embodiment. FIG. 10 and FIG. 11 show how the first display region and the second display region of the display device are changed according to a position of the viewer in accordance with the present example embodiment.

Referring to FIG. 7, the display system in accordance with the present example embodiment may include a display module 10, a control module 100, and a camera 30.

The display module 10 serving as the display module 10 included in the aforementioned display device 1 may be a transparent display module configured to have a horizontal cross-section formed of a closed curved line and being capable of emitting light from opposite surfaces thereof.

The camera 30 serves as a constituent element for photographing a position of a viewer 40 who views the display device 1. As shown in FIG. 1 and FIG. 9, the camera 30 may be located at an upper side of the display device 1 on a horizontally central axis of the display device 1 to photograph or track a position of the viewer 40, (e.g., a position of a face or an eye of the viewer 40 (S10)).

For example, the camera 30 may be configured to rotate about the horizontally central axis of the display device 1 according to the position of the viewer 40. Alternatively, a plurality of cameras may be provided above the display device 1 to photograph movement of the viewer 40 who is movable in 360 degrees along a peripheral direction of the display device 1 without being separately moved.

In the present example embodiment, the structure in which the camera 30 is mounted on the horizontally central axis of the display device 1 is taken as an example, but the position of the camera 30 for photographing and recognizing the position of the viewer 40 is not limited thereto.

The display system of the present example embodiment may further include a control module 100 to control a display region, which is displayed on the display device 1 according to the position of the viewer 40 photographed by the camera 30.

In accordance with the example embodiment, the control module 100 may include a camera controller 110, a position determiner 120, a display region controller 130, an image determiner 140, and an image generator 150.

The camera controller 110 is coupled to the camera 30 to obtain position information of the viewer 40 photographed by the camera 30 (e.g., real-time position coordinates of the viewer 40 (S20)). Herein, the position information of the viewer 40 may include face or eye position information of the viewer 40.

The position determiner 120 may compare the position information of the viewer 40 obtained by the camera controller 110 with reference position information to determine a relative position of the viewer 40 with respect to the display device 1 (S30).

Herein, the reference position may be defined as a range within an angle (e.g., a predetermined angle (e.g., 60 degrees)) in right and left directions with respect to a direction defined as the front in FIG. 9 (direction facing the viewer 40 in FIG. 9), for example. However, the reference position is not limited to the aforementioned range. The reference position may be variously set in consideration of the position of the display region according to the position of the viewer 40.

The display region controller 130 controls the display region according to the position of the viewer 40 determined by the position determiner 120 (S50).

In accordance with the example embodiment, the first display region 22 controlled by the display region controller 130 to display the first image 21 viewed to the viewer 40 may be a portion of the first light emitting surface 12 which has a semi-circular cross-section adjacent (or closest) to the viewer 40 as shown in FIG. 9, and the second display region 24 for displaying the second image 23 may be a portion of the second light emitting surface 14 which has a semi-circular cross-section distanced (or furthest) from the viewer 40.

For example, as shown in FIG. 9, when a plane including or passing through the viewer 40 and a central axis C of the display module 10 is defined as a first plane I and a plane which is perpendicular to the first plane I and has the central axis C of the display module 10 is defined as a second plane II, the first display region 22 may be defined as a first curved display surface having a semicircular cross-section located at a side of the viewer 40 with respect to the first plane I and the second display region 24 may be defined as a second curved display surface having a semicircular cross-section located at an opposite side to the first display region 22.

Accordingly, the display device 1 in accordance with the present example embodiment can display first image 21 externally when viewed in the radial direction of the display module 10 at the first display region 22 located close to the viewer 40, and display the second image 23 internally when viewed in the radial direction of the display module 10 at the second display region 24 located at an opposite side to the first display region 22 with respect to the horizontally central axis of the display module 10.

Each of the first display region 22 and the second display region 24 may be formed in such a size so as to have a smaller circular arc-like cross-section than the semi-circle, and may be varied depending on sizes and types of images to be displayed.

The direction in which the first image 21 is displayed is the same as the direction in which the second image 23 is displayed, and may be the direction in which the viewer 40 is located.

The first image 21 displayed at the first display region 22 close to the viewer 40 for the viewer 40 may be a foreground (e.g., a bus shown in FIG. 5) on a screen viewed by the viewer 40, and the second image 23 displayed at the second display region 24 located more distantly than the first display region 22 may be a background (e.g., a road on which cars pass and a building shown in FIG. 6) on a screen viewed by the viewer 40.

Accordingly, when the viewer 40 concurrently (e.g., simultaneously) views two images located at two different areas, the first image 21 and the second image 23 located at the different areas are overlapped and viewed by the viewer 40, thereby allowing the viewer 40 to perceive viewing a stereophonic image.

In this case, in accordance with the example embodiment, positions and sizes of the first display region 22 and the second display region 24, and the directions of the first display region 22 and the second display region 24 in which images are displayed, may be varied depending on the position of the viewer 40.

For example, when the viewer 40 is located within a reference position range as a result of determining the position of the viewer 40 by the position determiner 120, the previous image is maintained without changing the positions of the first display region 22 and the second display region 24 (S31).

However, when the position of the viewer 40 exceeds the reference position range as a result of determining the position of the viewer 40 by the position determiner 120, image movement amounts for changing the positions of the display regions 22 and 24 are determined to move the first display region 22 and the second display region 24 toward the viewer 40 (S40), and the display regions 22 and 24 are controlled (S50).

In this case, images displayed on the first display region 22 and the second display region 24 may be images stored in the image storage 142 or images inputted from the image input section 144 such as an image device.

To that end, the display system in accordance with the present example embodiment may further include the image storage 142 for storing image data and the image input section 144 for inputting images.

In this case, the display system in accordance with the present example embodiment may further include an image determiner 140 for determining which one of the images stored in the image storage 142 (S61) or inputted from the image input section 144 (S62) is to be displayed on the display region and in what size the image is displayed thereon.

After an image to be displayed on the display module is selected by the image determiner 140, and size of the image, a direction in which the image is displayed, and the like are selected (S60), this image is generated by the image generator 150 (S70) and then controlled to be displayed on the first display region 22 and the second display region 24 of the display module 10 (S80).

As described above, in accordance with the example embodiment, the positions of the first display region 22 and the second display region 24 may be varied depending on a position at which the display module 10 is viewed by the viewer 40. This will be described with reference to FIG. 9 to FIG. 11.

FIG. 9 shows a front side of the display device which is viewed by the viewer. FIG. 10 shows the front side of the display device rotated by an angle of $\alpha$ in a clockwise direction which is viewed by the viewer. FIG. 11 shows the front side of the display device rotated by an angle of $\beta$ in a counterclockwise direction which is viewed by the viewer.

As shown in FIG. 9 to FIG. 11, if the position at which the display device 1 is viewed by the viewer 40, as described above, the control module 100 controls the position of the display region to change positions of the first display region (22 in FIG. 9, 22' in FIGS. 10 and 22" in FIG. 11) and positions of the second display region (24 in FIG. 9, 24' in FIG. 10, and 24" in FIG. 11).

In this case, the control module 100 of the display device 1 in accordance with the present example embodiment can display the same image toward the viewer 40 even when the position at which the display device 1 is viewed by the viewer 40 is changed as shown in FIG. 9 to FIG. 11.

Further, the control module 100 of the display device 1 in accordance with present example embodiment can accomplish an effect as if the first image 21 located ahead of the second image 23 serving as a background stereoscopically moves, as the position at which the display device 1 is viewed by the viewer 40 is changed, by varying only the second image 23 which is to be displayed on the second display region 24 and maintaining the first image 21 which is to be displayed on the first display region 22 according to the position of the viewer 40 to be displayed to the viewer 40 as it is.

In accordance with the example embodiment, a dual stereoscopic image having a foreground and a background can be displayed to the viewer 40 in directions of 360 degrees with respect to the display device 1 by allowing the first display region 22 and the second display region 24 of the flexible transparent cylindrical display module 10 to display different images and displaying images on the display module according to the position of the viewer 40 through the position tracking function using the camera 30.

In this case, although the stereoscopic effect is accomplished by providing a dual display in which different images are displayed to the foreground and the background in the present example embodiment, the stereoscopic effect may be accomplished by displaying images on the first display region and the second display region according to luminance of objects as in the depth fused 3D display (DFD).

Further, when it is recognized that the position of the viewer is changed through the position tracking function using the camera, motion parallax can be provided to the viewer by changing the positions and sizes of the first display region and the second display region or images which is to be displayed on the first display region and the second display region, thereby accomplishing the stereoscopic effect.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims, and their equivalents.

DESCRIPTION OF REFERENCE SYMBOLS 1 display device
2 frame
10 display module
12 first light emitting surface
14 second light emitting surface
21 first image
22, 22', 22" first display region
23 second image
24, 24', 24" second display region
30 camera
40, 40' viewer
100 control module
110 camera controller
120 position determiner
130 display region controller
140 image determiner
150 image generator

What is claimed is:

1. A display device comprising:
a frame having a horizontal cross-section comprising a closed curve, the frame configured for body structural support;
a transparent display module in the frame, the transparent display module having a horizontal cross-section comprising a closed curve and configured to emit light at a first display surface region and a second display surface region in both inner and outer directions;
a tracking position determiner in communication with a camera and configured to detect a real-time position of a viewer relative to the display device; and
a controller coupled to the transparent display module, wherein the controller is configured to generate control information to reposition the first and second display surface regions based on the detected real-time position of the viewer.

2. The display device of claim 1, wherein the horizontal cross-section of the display module has a circularly or ellipsoidally tubular shape.

3. The display device of claim 2, wherein the opposite surfaces of the display module comprise a first light emitting surface configured to display a first image, and a second light emitting surface opposite to the first light emitting surface and configured to display a second image, wherein the first light emitting surface faces outside in a radial direction of the display module, and the second light emitting surface faces inside in the radial direction of the display module.

4. The display device of claim 3, wherein the first light emitting surface and the second light emitting surface are configured to display images in 360 degrees with respect to a longitudinal central axis of the display module.

5. A display system comprising:
a transparent display module having a horizontal cross-section comprising a closed curve and configured to emit light at a first display surface region and a second display surface region in both inner and outer directions;
a tracking position determiner in communication with a camera and configured to detect a real-time position of a viewer relative to the display system; and
a display region controller coupled to the transparent display module, wherein the display region controller is configured to generate control information to reposition the first and second display surface regions based on the detected real-time position of the viewer for displaying an image by the transparent display module.

6. The display system of claim 5, wherein the horizontal cross-section of the display module has a circularly or ellipsoidally tubular shape, and
the display module comprises a first light emitting surface facing outside in a radial direction of the display module, and a second light emitting surface facing inside in the radial direction.

7. The display system of claim 6, wherein the display region controller is configured to control the display region of the display module, wherein the display region comprises the first display surface region and the second display surface region,
wherein the first display surface region is a portion of the first light emitting surface and is configured to display a first image, and
wherein the second display surface region is a portion of the second light emitting surface opposite to the first display region with respect to a longitudinal central axis of the display module, and the second display surface region is configured to display a second image.

8. The display system of claim 7, further comprising an image storage configured to store the first image and the second image.

9. The display system of claim 7, further comprising an image input section configured to input the first image and the second image.

10. The display system of claim 7, wherein the second image is displayed in a same direction as the first image.

11. The display system of claim 10, wherein each of the first display surface region and the second display surface region has a circular arc or curve shaped cross-section with an angle of 180 degrees or smaller with respect to the longitudinal central axis.

12. The display system of claim 11, further comprising the camera configured to photograph position of a viewer who views the transparent display module,
wherein the display region controller comprises:
a camera controller configured to control the camera according to the position of the viewer; and
the tracking position determiner configured to determine the position of the viewer photographed by the camera.

13. The display system of claim 12, wherein the display region controller is configured to control the first display surface region and the second display surface region such that the first image and the second image are displayed in a direction in which the viewer is located.

14. The display system of claim 7, wherein the first image is a foreground image, and the second image is a background image.

15. A display control method of a transparent display module, the transparent display module comprising:
- a horizontal cross-section comprising a closed curve,
- a first light emitting surface facing externally in a radial direction of the display module, and
- a second light emitting surface facing internally in the radial direction, wherein the transparent display module is configured to emit light from the first and second light emitting surfaces,
- wherein the transparent display module is configured to emit light at a first display surface region and a second display surface region, the display control method comprising:
- determining a real-time position of a viewer relative to the transparent display module;
- respectively providing the first display surface region on which a first image is displayed and the second display surface region on which a second image is displayed onto the first light emitting surface and the second light emitting surface in a direction in which the viewer is located; and
- adjusting locations of the first and second display surface regions according to the real-time position of the viewer.

16. The display control method of claim 15, wherein the determining of the position of the viewer who views the transparent display module comprises:
- tracking a position of a face or an eye of the viewer, and
- obtaining coordinates of the position of the face or eye of the viewer.

17. The display control method of claim 16, further comprising:
- comparing position coordinates of the face or eye with reference position coordinates;
- determining a movement amount of the face or eye; and
- moving positions of the first display surface region and the second display surface region according to the movement amount of the face or eye after determining the position of the viewer who views the transparent display module.

\* \* \* \* \*